(12) United States Patent
Ishizaki

(10) Patent No.: US 6,911,743 B2
(45) Date of Patent: Jun. 28, 2005

(54) AEROGENERATOR HAVING A FLUID TRANSMISSION AND A GEAR TRANSMISSION

(75) Inventor: Naoki Ishizaki, Tochigi-Prefecture (JP)

(73) Assignee: Komatsu Ltd., Tokyo (JP)

( * ) Notice: Subject to any disclaimer, the term of this patent is extended or adjusted under 35 U.S.C. 154(b) by 377 days.

(21) Appl. No.: 10/322,942

(22) Filed: Dec. 18, 2002

(65) Prior Publication Data

US 2003/0168862 A1 Sep. 11, 2003

(30) Foreign Application Priority Data

Dec. 21, 2001 (JP) .......................................... 2001-390309

(51) Int. Cl.⁷ .............................. F03B 9/00; H02P 9/04
(52) U.S. Cl. ........................................... 290/55; 290/44
(58) Field of Search ........................ 290/55, 44; 415/15, 415/907, 7, 2.1; 60/353; 417/203, 216; 416/156, 7, 11; 91/506; 74/655; 180/307; 477/68

(56) References Cited

U.S. PATENT DOCUMENTS

| | | | | |
|---|---|---|---|---|
| 2,400,119 A | * | 5/1946 | Joy ............................. | 417/203 |
| 4,206,608 A | * | 6/1980 | Bell ............................. | 60/698 |
| 4,239,977 A | * | 12/1980 | Strutman ...................... | 290/44 |
| 4,498,017 A | * | 2/1985 | Parkins ......................... | 290/44 |
| 4,555,978 A | * | 12/1985 | Burandt et al. ................ | 91/506 |
| 4,766,779 A | * | 8/1988 | Massy ......................... | 74/731.1 |
| 5,122,036 A | * | 6/1992 | Dickes et al. ............. | 417/222.1 |
| 5,211,539 A | * | 5/1993 | McCarty ....................... | 416/61 |

FOREIGN PATENT DOCUMENTS

| | | |
|---|---|---|
| DE | 004224228 A1 * | 1/1993 |
| JP | 05-079450 | 3/1993 |
| JP | 11-280637 | 10/1999 |

OTHER PUBLICATIONS

"Development of a Wind Power System" by Fuji Heavy Industries Ltd., Japan Wind Energy Association Magazine, vol. 58, Jun. 2001.

"Development of Gearless Variable–Speed Aerogenerator", Mitsubishi Heavy Industries Technical Review, vol. 38, No. 2, Mar. 2001.

* cited by examiner

Primary Examiner—Darren Schuberg
Assistant Examiner—Julio Gonzalez
(74) Attorney, Agent, or Firm—Frishauf, Holtz, Goodman & Chick, P.C.

(57) ABSTRACT

An aerogenerator is provided wherein a fluid-driven transmission and a gear-driven transmission are arranged between a propeller and a generator. The fluid-driven transmission has a variable hydraulic pump and a variable hydraulic motor. The fluid-driven transmission varies a change gear ratio by varying the displacements of the pump and motor. The gear-driven transmission varies a speed increasing ratio between a rotating speed of the propeller and a rotating speed of the generator in synchronization with the gear change ratio of the fluid-driven transmission. A wind velocity of the propeller is detected by an anemometer. And the rotation speed of the propeller is controlled.

1 Claim, 4 Drawing Sheets

Diagram of embodiment

Diagram of planet gear

Graph showing relationships between wind velocity and displacements

Graph showing relationships between wind velocity, speed increasing ratio, and output rotating speed

AEROGENERATOR HAVING A FLUID TRANSMISSION AND A GEAR TRANSMISSION

BACKGROUND OF THE INVENTION

1. Field of the Invention

The present invention relates to an aerogenerator.

2. Description of the Related Art

Conventionally, there is a known aerogenerator for generating electric power by rotating a propeller by wind power, increasing a speed of rotation of the propeller by speed up gears, and transmitting power of the propeller to a generator.

Respective methods of conventional aerogenerators are as follows.

(1) A method in which speed up gears with a fixed speed increasing ratio are used and an induction generator is rotated at a rated speed to generate electric power. As this method, there is one in which two stages of speed up gears are used. This method is disclosed in Japanese Patent Application Laid-open No. 5-79450, for example.

(2) A method in which speed up gears with a fixed speed increasing ratio are used and a rotating speed of a generator is variable according to a rotating speed of a propeller. In this method, because a power generating frequency varies, the frequency is rectified to 50 Hz or 60 Hz by using a frequency converter such as an inverter. This method is described in a paper, "Development of a Wind Power System by Fuji Heavy Industries LTD." ("Japan Wind Energy Association Magazine"/vol.58, June 2001), for example.

(3) A direct power generating method in which power of a propeller is directly transmitted to a generator without using speed up gears. As this method, there is one in which a two-speed (low and high) operation is carried out by making changes in the number of poles of the induction generator. In this method, because a power generating frequency varies, the frequency is rectified to 50 Hz or 60 Hz by using a frequency converter such as an inverter. This method is described in a paper, "Development of Gearless Variable-speed Aerogenerator" ("Mitsubishi Heavy Industries Technical Review"/Vol.38, No. 2, March 2001), for example.

(4) A method in which a fluid-driven transmission formed of a hydraulic pump and a hydraulic motor is used as a speed up gear. This method is disclosed in Japanese Patent Application Laid-open No. 11-280637, for example.

If the method (1) is employed, because the speed increasing ratio is fixed, a rotating speed of a propeller is fixed at a constant rotating speed (e.g., 20 rpm) determined by a rated speed (e.g., 1500 rpm) of the generator and the fixed speed increasing ratio.

Therefore, regardless of whether the wind power is strong or weak, the rotating speed of the propeller is fixed. When the wind power is weak, electric power cannot be generated. When the wind power is strong, power generating efficiency is reduced.

If the propeller can be rotated at the rotating speed according to the wind power, it is said that energy conversion efficiency from wind power to electric power and the gross generated power increase by 20 to 25%.

If the above methods (2) and (3) are employed, because the rotating speed of the propeller can be changed according to the wind power, the energy conversion efficiency and the gross generated power can be increased.

However, because the output frequency of the generator varies, the frequency converter such as the inverter needs to be provided, which causes increase in the number of parts and an increase in the cost of the device.

On the other hand, if the above method (4) is employed, because speed is changed by the fluid-driven transmission, the rotating speed of the propeller can be changed by changing the speed according to the power wind and the output frequency of the generator can be kept at a constant value. As a result, the energy conversion efficiency and the gross generated power can be increased. Because the frequency converter such as the inverter becomes unnecessary, the number of parts and the device cost can be reduced.

However, in general, torque transmission efficiency of the fluid-driven transmission formed of the hydraulic pump and the hydraulic motor is low and a loss of energy is large as compared with those of a gear-driven transmission in which a planet gear mechanism or the like is used. It is said that the transmission efficiency of the fluid-driven transmission is about 80% while the transmission efficiency of the gear-driven transmission is about 95%.

Therefore, in the above method (4), it is impossible to efficiently use power of the propeller for generation of electric power.

Although it can be considered that the gear-driven transmission is used as the speed up gear and speed is changed by the gear-driven transmission, this means the new addition of a gear change mechanism and the structure becomes complicated, and the number of parts and the device cost increase.

SUMMARY OF THE INVENTION

The present invention has been accomplished with the above circumstances in view and it is an object of the invention to increase energy conversion efficiency and the gross generated power, reduce the number of parts and the device cost, enhance torque transmission efficiency, and reduce a loss of energy by changing speed without adding a complicated structure such as a gear change mechanism to a gear-driven transmission.

According to the invention, there is provided an aerogenerator for generating electric power by increasing a speed of rotation of a propeller and transmitting power of the propeller to a generator and comprising: a fluid-driven transmission which includes a variable displacement hydraulic pump and a variable displacement hydraulic motor, and which varies a change gear ratio by varying displacements; a gear-driven transmission which varies a speed increasing ratio between a rotating speed of the propeller and a rotating speed of the generator in synchronization with the change gear ratio of the fluid-driven transmission; and detecting means for detecting a wind velocity of the propeller; wherein the displacements are varied such that the speed increasing ratio is reduced as the wind velocity detected by the detecting means increases.

According to a first embodiment, as shown in FIG. 1, a fluid-driven transmission 40 and a gear-driven transmission 50 are disposed in parallel between an input shaft 11 which is a rotary shaft of the propeller 1 and an output shaft 61 which is a rotary shaft of the generator 6.

The fluid-driven transmission 40 is formed of a hydraulic pump 41 and a hydraulic motor 42 and displacements are variable. Displacements of the hydraulic pump 41 and the hydraulic motor 42 are varied by a displacement varying mechanism 43.

A speed increasing ratio is varied as follows.

An output rotary shaft 44 of the fluid-driven transmission 40 drives a ring gear 53 of a planet gear 51 through a gear 54. An output shaft 56 of speed up gears 2 and 3 drives a planet gear 52 of the planet gear 51 forming the gear-driven transmission 50. A sun gear 55 of the planet gear 51 drives a generator 6 through the output shaft 61.

An input shaft 45 of the fluid-driven transmission 40 is driven by the output shaft 56 of the speed up gears 2 and 3, i.e., the input shaft 56 of the gear-driven transmission 50 through gear wheels 57 and 58.

In the fluid-driven transmission 40, by reversing the pump displacement, a direction of rotation of the output shaft 44 can be reversed.

In order to reduce a speed increasing ratio e which is a ratio between a rotating speed of the propeller 1 and a rotating speed of the generator 6, the pump displacement is set at a negative value and the output shaft 44 of the fluid-driven transmission 40 is rotated in a reverse direction. As a result, the speed increasing ratio e can be reduced. In order to increase the speed increasing ratio e, the pump displacement is set at a positive value, a motor output is rotated in a normal direction to rotate the ring gear 53, and the rotating speed of the output shaft 61 of the planet gear 51 is increased. As a result, the speed increasing ratio e can be increased. By reducing the displacement of the hydraulic motor 42, a ratio of an output rotating speed of the hydraulic motor 42 to an input rotating speed of the hydraulic pump 41 can be increased.

A structure of the planet gear 51 is shown in FIG. 2.

With respect to the relationships between the rotating speeds of the respective gears, the following expression (1) can be obtained:

$$Ns/i1 - Np(1+1/i1) = NE/i2 \qquad (1)$$

where Ns is a rotating speed of the sun gear 55, Np is a rotating speed of the planet gear 52, NE is a rotating speed of the gear 54 engaged at an outer periphery of the ring gear 53, i1 is a speed increasing ratio of the planet gear 51, and i2 is a ratio of a rotating speed of the ring gear 53 to a rotating speed of the output shaft 44 of the hydraulic motor 42. As is clear from this expression, if the rotating speed Ns of the sun gear 55 is constant, the rotating number Np of the planet gear 52 reduces and the speed increasing ratio increases when a rotating speed NE of the gear 54 increases. If the rotating speed Ns of the sun gear 55 is constant and the rotating speed NE of the gear 54 reduces, the rotating speed Np of the planet gear 52 increases and the speed increasing ratio e reduces.

A wind velocity V of the propeller 1 is detected by detecting means 7 such as an anemometer.

As shown by a characteristic L1 in FIG. 3, the displacement controlling mechanism 43 is actuated to reduce the displacement Dp of the hydraulic pump 41 as the wind velocity V detected by the detecting means 7 increases. As shown by a characteristic L2, the displacement controlling mechanism 43 is actuated to increase the displacement Dm of the hydraulic motor 42 as the wind velocity V increases. As a result, as shown by a characteristic L3 in FIG. 4, the speed increasing ratio e reduces as the wind velocity V increases.

As described above, because the speed increasing ratio e is varied such that the speed increasing ratio e reduces as the velocity V of wind to which the propeller 1 is exposed increases so as to vary the rotating speed of the propeller 1, the energy conversion efficiency and the gross generated power increase.

Because the speed increasing ratio e is varied while fixing the rotating speed of the generator 6 and keeping the output frequency at a constant value, provision of a frequency converter such as an inverter becomes unnecessary and the number of parts and the device cost can be reduced.

The speed is changed by varying the displacement Dp of the hydraulic pump 41 and the displacement Dm of the hydraulic motor 42 by the fluid-driven transmission 40, and there is no need to provide a gear change mechanism to the gear-driven transmission 50. Therefore, the structure of the gear-driven transmission 50 does not become complicated and the number of parts and the device cost can be reduced.

In the invention, power of the propeller 1 is divided and distributed to both the fluid-driven transmission 40 and the gear-driven transmission 50 and is transmitted to the generator 6.

Here, assuming that transmission efficiency $\eta 1$ of the fluid-driven transmission 40 is 80%, that transmission efficiency $\eta 2$ of the gear-driven transmission 50 is 95%, and that power of the propeller 1 is divided into two, transmission efficiency $\eta(=87.5\%)$ is expressed by the following expression (2) and is enhanced as compared with that ($\eta 1=80\%$) in a case in which only the fluid-driven transmission 40 is used.

$$\eta(=87.5\%) = (\eta 1(=80\%) + \eta 2(=95\%))/2 \qquad (2)$$

Consequently, according to the invention, torque transmission efficiency is enhanced and a loss of energy is reduced.

DETAILED DESCRIPTION OF PREFERRED EMBODIMENT

An embodiment of an aerogenerator according to the present invention will be described below by reference to the drawings.

Figure 1:
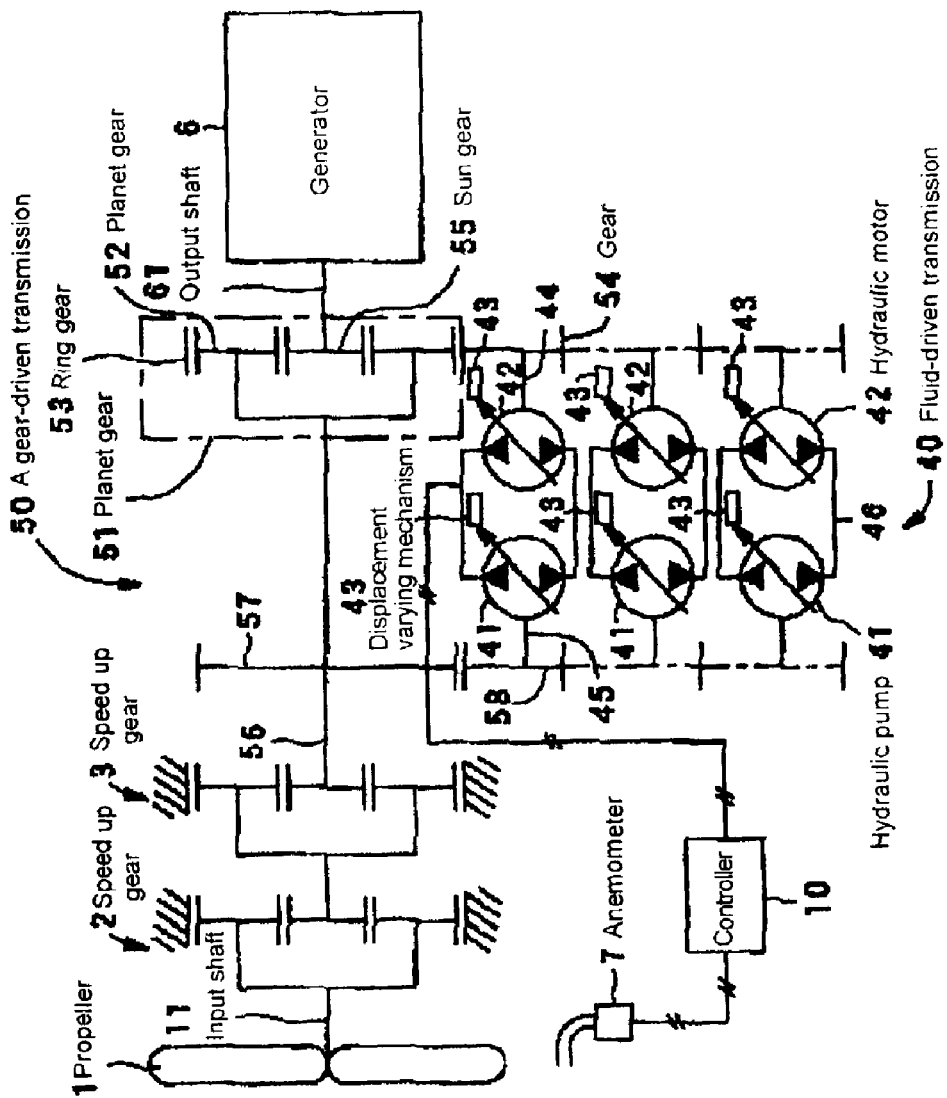
FIG. 1 is a diagram of one embodiment according to the present invention.

FIG. 1 shows a structure of an aerogenerator according to one embodiment of the present invention.

As shown in FIG. 1, the aerogenerator of this embodiment is formed of a propeller 1 rotating by receiving wind power, a generator 6 for supplying power to a power transmission line (not shown), a fluid-driven transmission 40 formed of a hydraulic pump 41 and a hydraulic motor 42, and a gear-driven transmission 50 formed of a planet gear mechanism in broad outline.

Between an input shaft 11 which is a rotary shaft of the propeller 1 and an output shaft 61 which is a rotary shaft of the generator 6, the fluid-driven transmission 40 and the gear-driven transmission 50 are disposed in parallel.

The fluid-driven transmission 40 is formed of the variable displacement hydraulic pump 41, the variable displacement hydraulic motor 42, an oil path 46 for connecting the hydraulic pump 41 and the hydraulic motor 42, and a displacement varying mechanism 43 for varying a displacement Dp of the variable displacement hydraulic pump 41 and a displacement Dm of the variable displacement hydraulic motor 42. The hydraulic motor 42 rotates according to a flow rate of pressure oil discharged from the hydraulic pump 41 and a change gear ratio r which is a ratio between a rotating speed of the hydraulic pump 41 and a rotating speed of the hydraulic motor 42 is varied by varying the displacement Dp of the hydraulic pump 41 and the displacement Dm of the hydraulic motor 42.

In the present embodiment, speed up gears 2 and 3 are provided in a preceding stage of the gear-driven transmission 50.

In other words, the input shaft 11 which is the rotary shaft of the propeller 1 is connected to a planet gear of the speed up gear 2. A sun gear of the speed up gear 2 is connected to a planet gear of the speed up gear 3. A sun gear of the speed up gear 3 is connected to an input shaft 56 of the gear-driven transmission 50. Therefore, speed of rotation of the propeller 1 is increased by the speed up gears 2 and 3 and power is transmitted to the gear-driven transmission 50. In other words, if a total speed increasing ratio of the speed up gears 2 and 3 is e1, the input shaft 56 of the gear-driven transmission 50 rotates at rotating speed obtained by multiplying a rotating speed of the propeller 1 by the speed increasing ratio e1.

The input shaft 56 is connected to a planet gear 52 of a planet gear 51 which is a speed up gear in a subsequent stage. A ring gear 53 of the planet gear 51 is connected to a gear 54. The gear 54 is connected to an output rotary shaft 44 of the hydraulic motor 42.

Therefore, the hydraulic motor 42 rotates at a rotating speed according to a rotating speed of the ring gear 53 of the planet gear 51.

In the fluid-driven transmission 40, by reversing a pump displacement, rotation of the output shaft 44 can be reversed.

In order to reduce the speed increasing ratio e2 of the gear-driven transmission 50, a pump displacement Dp is set at a negative value and the output shaft 44 of the fluid-driven transmission 40 is rotated in a reverse direction. As a result, the speed increasing ratio e2 can be reduced. In order to increase the speed increasing ratio e2, the pump displacement Dp is set at a positive value, the motor output is rotated in a normal direction to rotate the ring gear 53, and the rotating speed of the output shaft 61 of the planet gear 51 is increased. As a result, the speed increasing ratio e2 can be increased. By reducing the displacement Dm of the hydraulic motor 42, a ratio of an output rotating speed of the hydraulic motor 42 to an input rotating speed of the hydraulic pump 41 can be increased.

Figure 2:
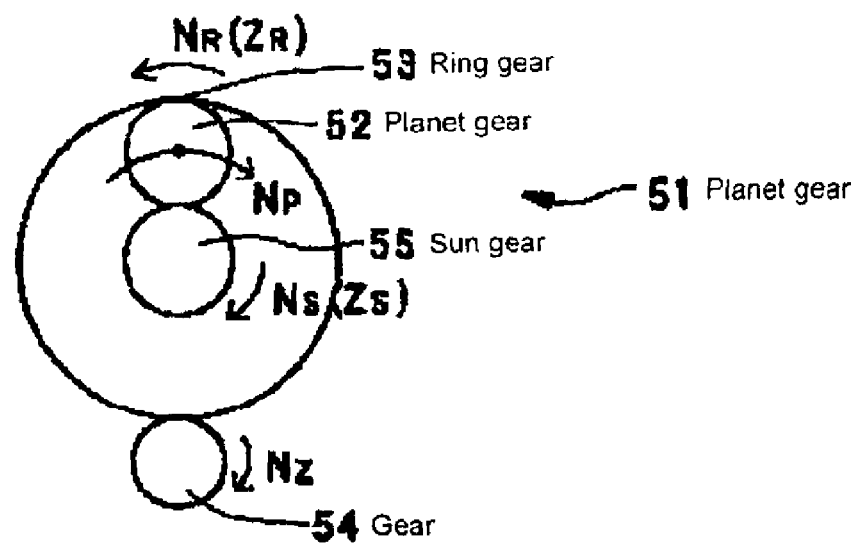
FIG. 2 is a diagram showing a planet gear portion of a gear-driven transmission.

A structure of the planet gear 51 is shown in FIG. 2.

Relationships between the rotating speeds of the respective gears are expressed by the above-described expression $$(Ns/i1 - Np(1+1/i1) = NE/i2).$$

As is clear from this expression, if a rotating speed Ns of the sun gear 55 is constant, a rotating number Np of the planet gear 52 reduces and the speed increasing ratio e2 increases when a rotating speed NE of the gear 54 increases. If the rotating speed Ns of the sun gear 55 is constant and the rotating speed NE of the gear 54 reduces, the rotating speed Np of the planet gear 52 increases and the speed increasing ratio e2 reduces.

In the vicinity of the propeller 1, an anemometer 7 for detecting a velocity of flow of wind to which the propeller 1 is exposed, i.e., a wind velocity V (m/sec) is provided. As the anemometer 7, a Pitot tube can be used, for example.

A detection signal of the anemometer 7 is input into the displacement varying mechanism 43 through a controller 10.

Figure 3:
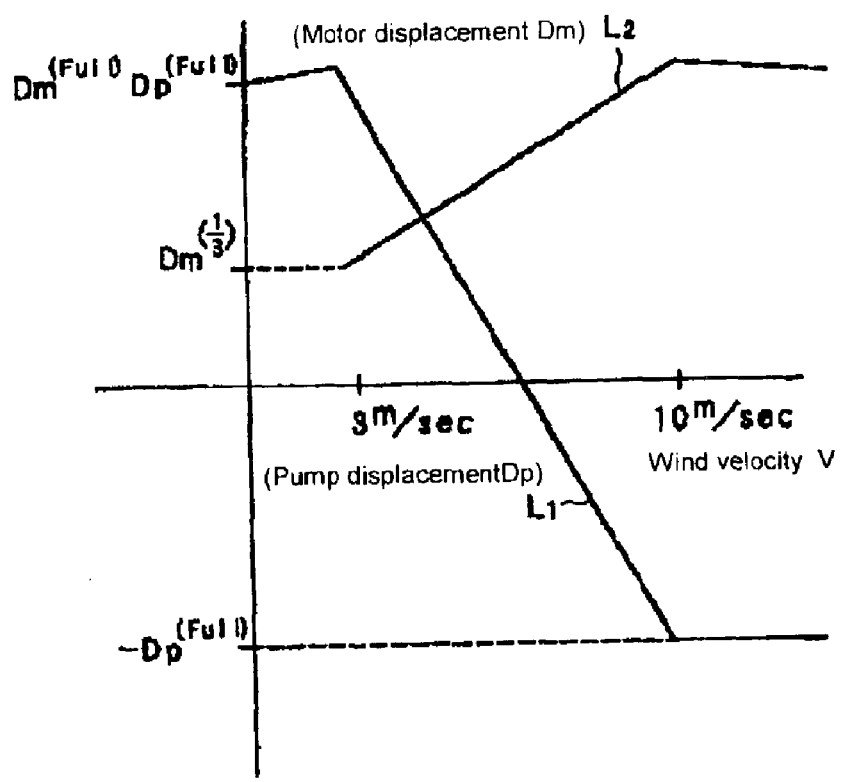
FIG. 3 is a graph showing relationships between a velocity of wind to which a propeller is exposed, a displacement of a hydraulic pump, and a displacement of a hydraulic motor.

FIG. 3 shows a relationship L1 between a velocity V of wind to which the propeller 1 is exposed and the displacement Dp of the hydraulic pump 41 and a relationship L2 between the wind velocity V and the displacement Dm of the hydraulic motor 42.

The detection signal V of the anemometer 7 is input into the displacement varying mechanism 43 and the displacement varying mechanism 43 varies the displacement of the hydraulic pump 41 such that the displacement Dp of the hydraulic pump 41 reduces as the wind velocity V increases as shown by a characteristic L1 in FIG. 3. The displacement varying mechanism 43 varies the displacement of the hydraulic motor 42 such that the displacement Dm of the hydraulic motor 42 increases as the wind velocity V increases as shown by a characteristic L2.

As shown in FIG. 3, between 3 m/sec and 10 m/sec of the wind velocity V, for example, the pump displacement Dp varies inversely with the wind velocity V and the motor displacement Dm varies in direct proportion to the wind velocity V. In a range in which the wind velocity V is over 10 m/sec, the pump displacement Dp is constantly a negative maximum displacement −Dp (Full) of the hydraulic pump 41. When the wind velocity V is 3 m/sec or less, the displacement Dp of the hydraulic pump 41 is constantly a maximum displacement Dp (Full) and the displacement Dm of the hydraulic motor 42 is constantly a displacement Dm (⅓) which is one-third the maximum displacement.

Figure 4:
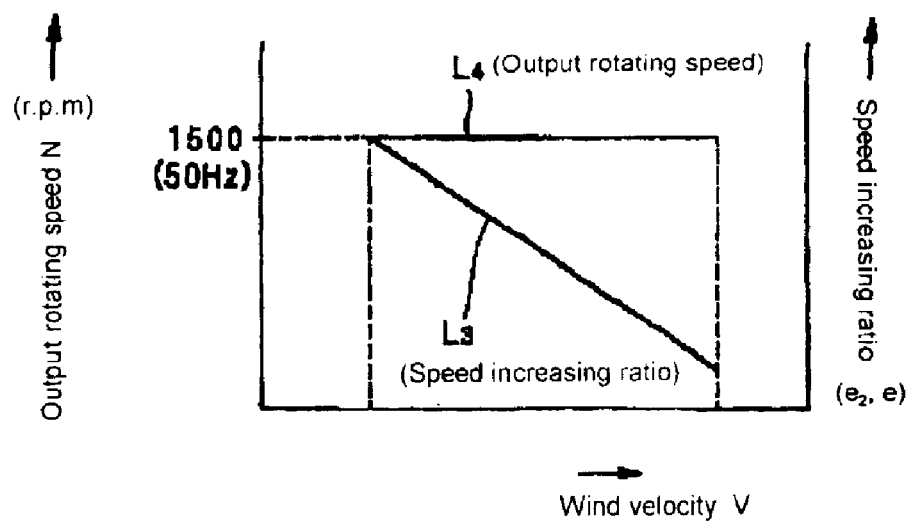
FIG. 4 is a graph showing relationships between a wind velocity, a speed increasing ratio of speed up gears, and an output rotating speed of the gear-driven transmission.

As described above, if the displacement Dp of the hydraulic pump 41 is reduced and the displacement Dm of the hydraulic motor 42 is increased as the wind velocity V increases, the speed increasing ratio e2 reduces as the wind velocity V increases. In other words, because the speed increasing ratio e2 reduces as the wind velocity V increases as shown by a characteristic L3 in FIG. 4, the rotating speed of the generator 6 is constantly a rated rotating speed (1500 rpm, for example) as shown by a characteristic L4 in FIG. 4. In FIG. 4, as the speed increasing ratio e2 varies, a speed increasing ratio e which is the sum of the speed increasing ratio e1 and the speed increasing ratio e2 varies similarly.

As described above, in the present embodiment, because the speed increasing ratio e is varied such that the speed increasing ratio reduces as the velocity V of wind to which the propeller 1 is exposed increases to thereby vary the rotating speed of the propeller 1, energy conversion efficiency and the gross generated power are increased.

Because the speed increasing ratio e is varied while fixing the rotating speed of the generator 6 to keep an output frequency at a constant value, there is no need to mount a frequency converter such as an inverter and the number of parts and the device cost can be reduced.

The speed is changed by varying the displacement Dp of the hydraulic pump 41 and the displacement Dm of the hydraulic motor 42 by the fluid-driven transmission 40 and there is no need to provide a gear change mechanism to the gear-driven transmission 50. Therefore, the structure of the gear-driven transmission 50 does not become complicated and the number of the parts and the device cost can be reduced.

In the shown embodiment, power of the propeller 1 is divided and distributed to both the fluid-driven transmission 40 and the gear-driven transmission 50 and is transmitted to the generator 6. Although the fluid-driven transmission 40 has a structure in which three sets of the hydraulic pump 41 and the hydraulic motor 42 are arranged in parallel in FIG. 1, the number of the hydraulic pumps and the hydraulic motors constituting the fluid-driven transmission 40 and an arrangement of the pumps and the motors are arbitrary.

Here, assuming that transmission efficiency η1 of the fluid-driven transmission 40 is 80%, that transmission efficiency η2 of the gear-driven transmission 50 is 95%, and that power of the propeller 1 is divided into two, transmission efficiency η(=87.5%) is expressed by the following expression (2) and is enhanced as compared with that (η1=80%) in a case in which only the fluid-driven transmission 40 is used.

$$\eta(=87.5\%)=(\eta 1(=80\%)+\eta 2(=95\%))/2 \qquad (2)$$

Consequently, according to the above described embodiment, torque transmission efficiency is enhanced and a loss of energy is reduced.

What is claimed is:

1. An aerogenerator for generating electric power by increasing a speed of rotation of a propeller and transmitting power of said propeller to a generator, said aerogenerator comprising:

a fluid-driven transmission which includes a variable displacement hydraulic pump and a variable displacement hydraulic motor, and which varies a change gear ratio by varying displacements;

a gear-driven transmission which varies a speed increasing ratio between a rotating speed of said propeller and a rotating speed of said generator in synchronization with said change gear ratio of said fluid-driven transmission; and an anemometer;

wherein said displacements are varied such that said speed increasing ratio is reduced as a wind velocity detected by said anemometer increases.

* * * * *